United States Patent
Sugihara et al.

(10) Patent No.: US 11,658,327 B2
(45) Date of Patent: *May 23, 2023

(54) CELL STACK DEVICE, MODULE, AND MODULE HOUSING DEVICE

(71) Applicant: KYOCERA Corporation, Kyoto (JP)

(72) Inventors: Kazunari Sugihara, Yokohama (JP); Makoto Koi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,861

(22) Filed: Dec. 17, 2021

(65) Prior Publication Data
US 2022/0109176 A1    Apr. 7, 2022

Related U.S. Application Data

(63) Continuation of application No. 16/608,219, filed as application No. PCT/JP2018/011783 on Mar. 23, 2018, now Pat. No. 11,239,486.

(30) Foreign Application Priority Data

Apr. 25, 2017  (JP) .............................. JP2017-086310

(51) Int. Cl.
*H01M 8/2485* (2016.01)
*H01M 8/243* (2016.01)

(52) U.S. Cl.
CPC ......... *H01M 8/2485* (2013.01); *H01M 8/243* (2013.01)

(58) Field of Classification Search
CPC .................................................. H01M 8/2485
See application file for complete search history.

(56) References Cited

U.S. PATENT DOCUMENTS

| | | | |
|---|---|---|---|
| 2006/0204826 A1 | 9/2006 | Borchers | |
| 2015/0125775 A1* | 5/2015 | Kuwayama | ....... H01M 8/04164 429/452 |
| 2017/0040633 A1 | 2/2017 | Kawaguchi et al. | |
| 2017/0309931 A1* | 10/2017 | Nakata | ............. H01M 8/04014 |

FOREIGN PATENT DOCUMENTS

| | | |
|---|---|---|
| DE | 102012219104 A1 | 5/2014 |
| JP | 5766132 B2 | 8/2015 |
| JP | 5873949 B1 | 3/2016 |

* cited by examiner

*Primary Examiner* — Brian R Ohara
(74) *Attorney, Agent, or Firm* — Viering, Jentschura & Partner mbB (57) ABSTRACT

A cell stack in which a plurality of cells may have a cylindrical shape and may include gas flow passages may be arranged uprightly and may be electrically connected may include: a manifold configured to fix lower ends of the plurality of cells and supply gas to the gas flow passages of the plurality of cells, and a gas supply pipe configured to supply the gas to the manifold. The gas supply pipe may include one end connected to a gas supply portion and another end inserted into a first through hole provided in the manifold, and may be joined to the manifold via a first joining portion. The gas supply pipe may include a first protruding portion protruding toward an inner side of the gas supply pipe and located at a position corresponding to the first joining portion in any cross-section along an insertion direction of the gas supply pipe.

12 Claims, 9 Drawing Sheets

FIG. 13

CELL STACK DEVICE, MODULE, AND MODULE HOUSING DEVICE

CROSS-REFERENCE TO RELATED APPLICATIONS

This application is a continuation of U.S. application Ser. No. 16/608,219 filed on Oct. 25, 2019, which is a national stage entry according to 35 U.S.C. § 371 of PCT Application No. PCT/JP2018/011783 filed on Mar. 23, 2018, which claims priority to Japanese Application No. 2017-086310 filed on Apr. 25, 2017, which are entirely incorporated herein by reference.

TECHNICAL FIELD

The present disclosure relates to a cell stack device, a module, and a module housing device.

BACKGROUND

In recent years, as a next-generation energy source, for example, JP 5766132 B (hereinafter, referred to as PTL 1) discusses a cell stack device in which a plurality of fuel cells are arranged in a manifold. The fuel cells are cells that may be capable of obtaining electrical power by using fuel gas (hydrogen-containing gas) and oxygen-containing gas (air).

Further, for example, JP 5873949 B (hereinafter, referred to as PTL 2) discusses a device in which a manifold may include an introduction pipe configured to introduce gas to an internal space of the manifold, one end portion of the introduction pipe may be inserted into a through hole provided in the manifold, and the introduction pipe and the manifold may be joined via a joining portion.

SUMMARY

A cell stack device according to a non-limiting embodiment of the present disclosure may include a cell stack in which a plurality of cells may have a cylindrical shape and may include gas flow passages may be arranged uprightly and may be electrically connected may include a manifold configured to fix lower ends of the plurality of cells and supply gas to the gas flow passages of the plurality of cells, and a gas supply pipe configured to supply the gas to the manifold. The gas supply pipe may include one end connected to a gas supply portion and another end inserted into a first through hole provided in the manifold, and may be joined to the manifold via a first joining portion. The gas supply pipe may include a first protruding portion protruding toward an inner side of the gas supply pipe and located at a position corresponding to the first joining portion in any cross-section along an insertion direction of the gas supply pipe.

A module according to a non-limiting embodiment of the present disclosure may include the cell stack device housed in a housing container.

A module housing device according to a non-limiting embodiment of the present disclosure may include the module and an auxiliary device configured to operate the module. The module and the auxiliary device may be housed in an external casing.

DETAILED DESCRIPTION

With reference to FIGS. 1 to 13, description will be made of a non-limiting example of a cell stack device, a module, and a module housing device according to various non-limiting aspects of the present disclosure.

Figure 1:
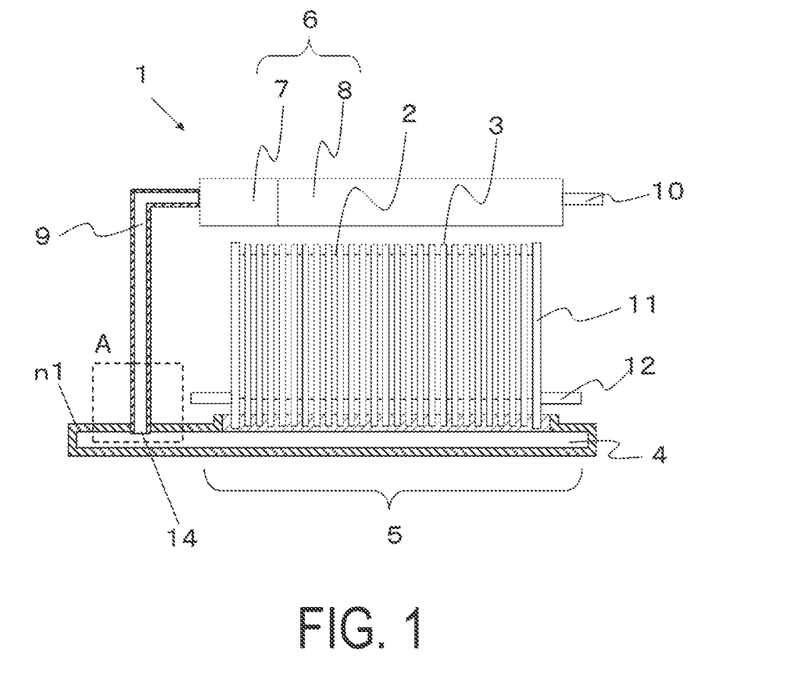
FIG. 1 is a side view and a partial cross-sectional view illustrating a non-limiting example of a cell stack device according to a non-limiting embodiment.
Figure 2A:
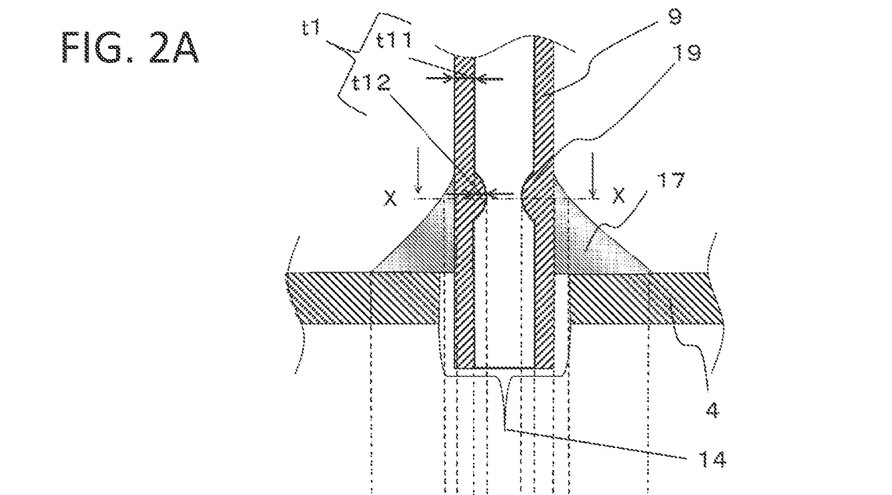
FIG. 2A is an enlarged vertical cross-sectional view illustrating a non-limiting example of section A in FIG. 1.
Figure 2B:
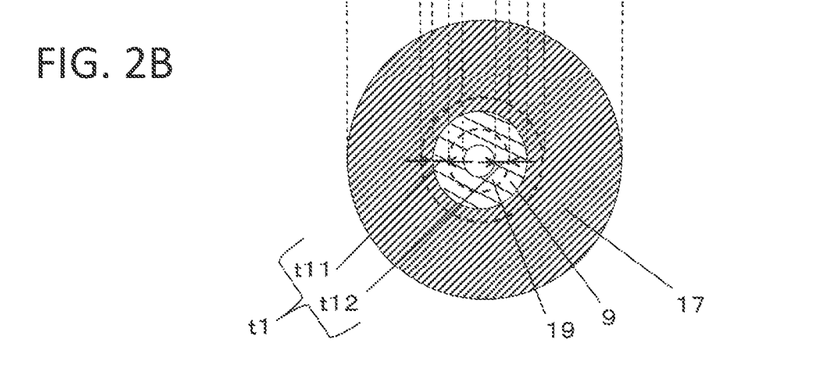
FIG. 2B is a horizontal cross-sectional view taken along line X-X in FIG. 2A.

FIG. 1 is a side view illustrating a non-limiting example of the cell stack device according to a non-limiting embodiment and a portion of the cell stack device is illustrated in a partial cross-sectional view for ease of understanding. Further, FIG. 2A is an enlarged vertical cross-sectional view illustrating a non-limiting example of section A in FIG. 1, and FIG. 2B is a horizontal cross-sectional view taken along line X-X in FIG. 2A. Note that in the subsequent figures, the same members will be denoted by the same reference signs.

In a cell stack device 1 illustrated in FIG. 1, cells 3 are arranged uprightly in a row, and each include a gas flow passage (not illustrated) through which gas flows from one end to another end inside the cell. The cells 3 adjacent to each other are electrically connected in series via a conductive member (not illustrated). Moreover, the cell stack device 1 illustrated in FIG. 1 includes one cell stack 5 in which lower ends of the cells 3 are fixed to a manifold 4 with an insulating adhesive (not illustrated) such as a glass sealing material.

Further, a reformer 6 serving as a gas supply portion configured to generate gas to be supplied to the cells 3 is disposed above the cell stack 5. Note that in the following description, the gas supply portion will be described as the reformer 6 unless otherwise noted.

Further, an end conductive member 11 is disposed at an end portion of the cell stack 5. The end conductive member 11 includes a conductive portion 12 and is configured to collect electricity generated by power generation in the cell stack 5 (cells 3) and draw the electricity to the outside.

Note that the cell stack device 1 can also include the reformer 6.

Further, a hollow flat plate-shaped cell including a plurality of gas flow passages in which gas flows in a lengthwise direction is given as a non-limiting example of the cell 3 in FIG. 1. The cell 3 is a solid oxide cell formed by sequentially stacking an inner electrode layer, a solid electrolyte layer, and an outer electrode layer on a surface of a support body including the gas flow passages. Note that in the following description, the inner electrode layer will be described as a fuel electrode layer, and the outer electrode layer will be described as an oxygen electrode layer unless otherwise noted.

Here, in the cell 3, a portion in which the fuel electrode layer and the oxygen electrode layer face each other, via the solid electrolyte layer, functions as a power generating element. That is, oxygen-containing gas such as air flows outside the oxygen electrode layer, and fuel gas (hydrogen-containing gas) flows in the gas flow passages inside the support body. The oxygen-containing gas and the fuel gas are heated to a predetermined actuation temperature to generate power. Then, electrical current generated by such power generation is collected via the end conductive member 11 described above.

Further, the reformer 6 illustrated in FIG. 1 reforms raw fuel such as natural gas and kerosene supplied via a raw fuel supply pipe 10, and generates gas. Note that the reformer 6 can adopt a structure capable of performing steam reforming that is very efficient reforming reaction, and includes a vaporizing portion 7 configured to vaporize water and a reforming portion 8 in which a reforming catalyst (not illustrated) that reforms raw fuel into gas is disposed. Then, the gas generated in the reformer 6 is supplied to the manifold 4 via a gas supply pipe 9, and is supplied from the manifold 4 to the gas flow passages provided inside the cells 3.

Note that in FIG. 1, the gas supply pipe 9 and the manifold 4 are illustrated in a cross-sectional view, and the rest is illustrated in a side view.

Further, in a non-limiting embodiment, the gas supply pipe 9 includes one end connected to the reformer 6, and another end inserted into a first through hole 14 provided in the manifold 4, and is joined to the manifold 4 via a first joining portion 17.

Meanwhile, in the cell stack device 1, in a case where the gas supply pipe 9 is deformed or moves due to heat generated at the time of power generation of the fuel cells, there may be a risk that cracking or chipping due to fatigue breakage or the like may be generated in the first joining portion 17 between the gas supply pipe 9 and the manifold 4, depending on the shape of the gas supply pipe 9. Thus, there has been room for improvement in firmly joining the gas supply pipe 9 and the manifold 4.

In view of this, in a non-limiting embodiment, as illustrated in FIG. 2A, the gas supply pipe 9 includes a first protruding portion 19 protruding toward an inner side of the gas supply pipe 9 and located at a position corresponding to the first joining portion 17. Accordingly, even when the gas supply pipe 9 is deformed or moves, due to the first protruding portion 19, a thickness t1 of the gas supply pipe 9 at the first protruding portion 19 is increased at the position corresponding to the first joining portion 17, and thus cross-sectional area of the gas supply pipe 9 increases, and generation of cracking or chipping due to fatigue breakage or the like in the first joining portion 17 joined to the gas supply pipe 9 can be suppressed. Accordingly, the gas supply pipe 9 and the manifold 4 can be joined firmly, and as a result, joining reliability between the gas supply pipe 9 and the manifold 4 can be improved.

Here, as illustrated in FIG. 2A and FIG. 2B, the thickness t1 of the gas supply pipe 9 at the first protruding portion 19 is a thickness obtained by adding a maximum thickness t12 of the first protruding portion 19 to a thickness t11 of the gas supply pipe 9 itself.

As illustrated in FIG. 2B, the first protruding portion 19 can be provided along an entire circumference of an inner surface of the gas supply pipe 9 from a viewpoint of increasing the cross-sectional area of the gas supply pipe 9. Accordingly, generation of cracking or chipping due to fatigue breakage or the like in the first joining portion 17 joined to the gas supply pipe 9 can be suppressed.

Figure 3A:
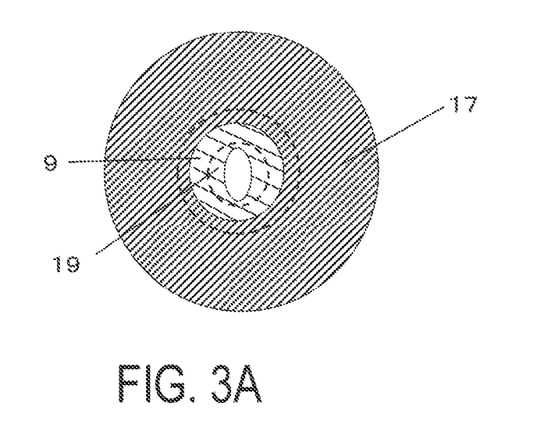
FIG. 3A is a horizontal cross-sectional view illustrating another non-limiting example of FIG. 2B.
Figure 3B:
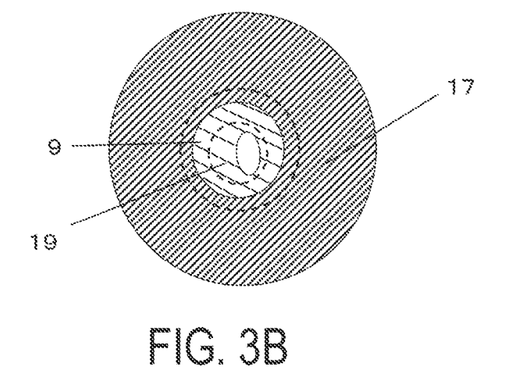
FIG. 3B is a horizontal cross-sectional view illustrating another non-limiting example of FIG. 2B.
Figure 3C:
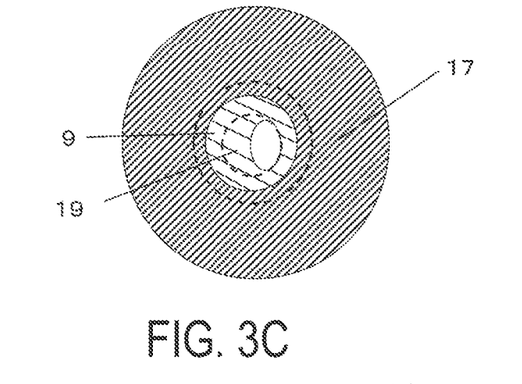
FIG. 3C is a horizontal cross-sectional view illustrating another non-limiting example of FIG. 2B.

Each of FIG. 3A, FIG. 3B, and FIG. 3C is a horizontal cross-sectional view illustrating another non-limiting example of FIG. 2B.

Each of FIG. 3A and FIG. 3B illustrates a non-limiting example in which a thickness of the gas supply pipe 9 at the first protruding portion 19 is uneven along an entire circumference.

As in FIG. 3A, a thin portion and a thick portion may be line-symmetrical. Further, as in FIG. 3B, the thin portion and the thick portion may be eccentric. As described above, even when the thickness of the gas supply pipe 9 at the first protruding portion 19 is uneven along the entire circumference, the gas supply pipe 9 remains thick without change, and generation of cracking or chipping due to the portion can be suppressed.

On the other hand, the first protruding portion 19 is not necessarily required to be provided along the entire circumference. As in FIG. 3C, the first protruding portion 19 may be provided partially. Even in the case where the first protruding portion 19 is provided partially as described above, generation of cracking or chipping due to the portion at which the gas supply pipe 9 is thick can be suppressed.

The thickness of the gas supply pipe 9 can be, for example, from 0.5 mm to 1.0 mm, and the thickness of the first protruding portion 19 can be, for example, from 0.1 mm to 0.5 mm.

Figure 4:
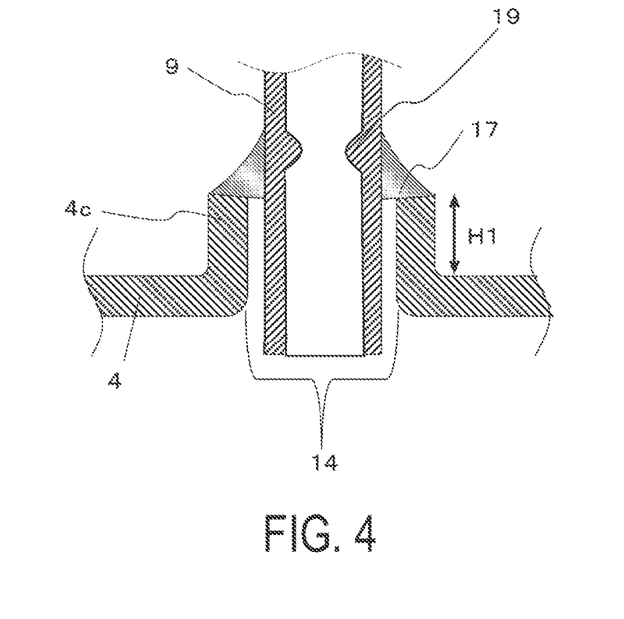
FIG. 4 is an enlarged vertical cross-sectional view illustrating another non-limiting example of section A of FIG. 1.
Figure 5:
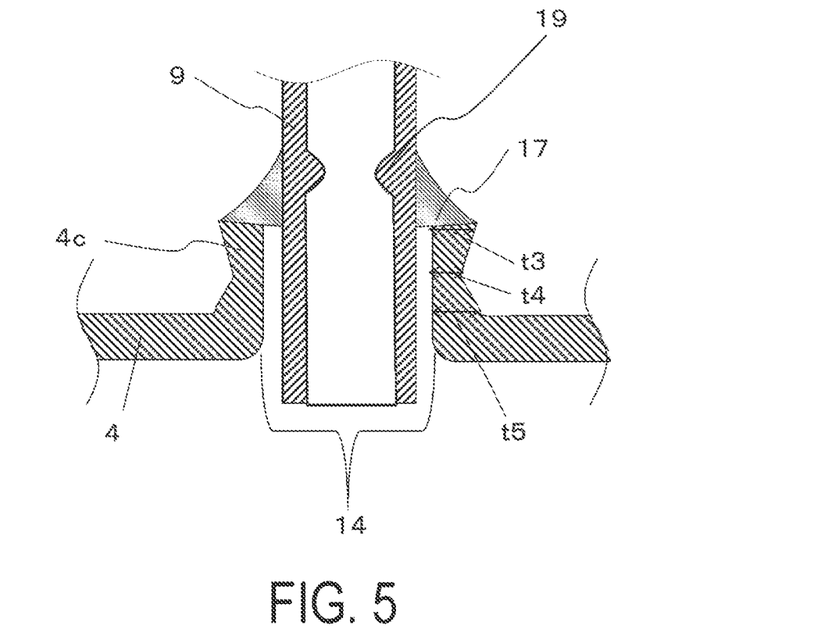
FIG. 5 is an enlarged vertical cross-sectional view illustrating another non-limiting example of section A of FIG. 1.

Each of FIG. 4 and FIG. 5 is an enlarged vertical cross-sectional view illustrating another non-limiting example of section A of FIG. 1.

In a non-limiting example illustrated in FIG. 4, a first bent portion 4c extending toward the reformer 6 side along the gas supply pipe 9 is provided in an outer periphery of the first through hole 14 in the manifold 4, and an upper end portion of the first bent portion 4c and the gas supply pipe 9 are joined via the first joining portion 17. The manifold 4 includes the first bent portion 4c, and thus the manifold 4 and the gas supply pipe 9 are joined easily. Further, the gas supply pipe 9 is inserted into the first through hole 14 easily.

Note that a height H1 of the first bent portion 4c can be, for example, from 2 mm to 5 mm.

In the non-limiting example illustrated in FIG. 5, a thickness t3 of the upper end portion of the first bent portion 4c is larger than a thickness t4 of a center portion the first bent portion 4c and smaller than a thickness t5 of a lower end portion of the first bent portion 4c. In other words, the first bent portion 4c has such a shape that the center portion is recessed with respect to the upper end portion and the lower end portion expands. Accordingly, cross-sectional area of the upper end portion of the first bent portion 4c increases, and hence the upper end portion of the first bent portion 4c and the gas supply pipe 9 are firmly joined via the first joining portion 17. Moreover, the center portion is recessed with respect to the upper end portion of the first bent portion 4c, and thus the thickness t4 of the center portion is the smallest among the thickness t3, the thickness t4, and the thickness t5. This center portion having a small thickness can relieve stress generated when the gas supply pipe 9 is deformed or moves. Accordingly, the gas supply pipe 9 and the manifold 4 can be joined firmly. Furthermore, the lower end portion of the first bent portion 4c expands, and accordingly an angle formed between the first bent portion 4c and the manifold 4 is obtuse to obtain a gently-sloping shape. Hence, stress generated when the gas supply pipe 9 is deformed or moves can be relieved. As a result, generation of cracking or chipping between the first bent portion 4c and the manifold 4 can be suppressed.

At the first bent portion 4c, the thickness t3 can be, for example, 0.6 mm to 0.8 mm, the thickness t4 can be, for example, 0.5 mm to 0.6 mm, and the thickness t5 can be, for example, from 0.9 mm to 1.2 mm.

Figure 6A:
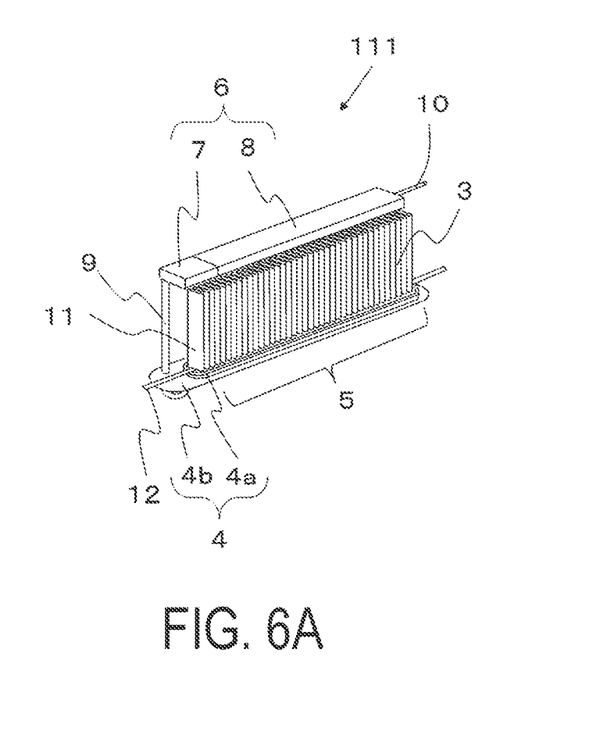
FIG. 6A is an external perspective view illustrating another non-limiting example of a cell stack device according to a non-limiting embodiment.
Figure 6B:
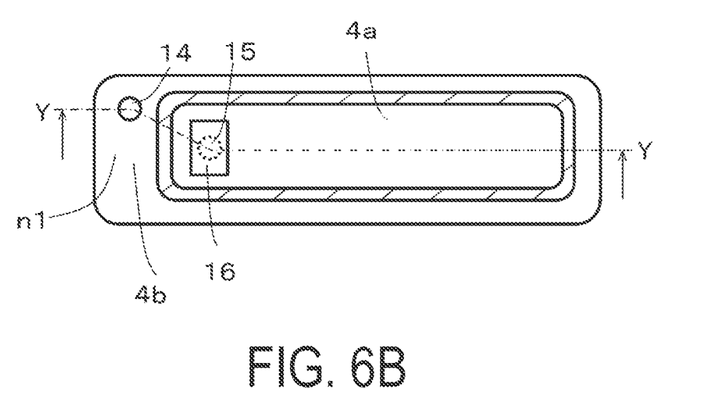
FIG. 6B is a plan view of the manifold illustrated in FIG. 6A.

FIG. 6A is an external perspective view illustrating another example of a cell stack device according to a non-limiting embodiment, and FIG. 6B is a plan view of the manifold illustrated in FIG. 6A. Further, FIG. 7 is a cross-sectional view taken along line Y-Y in FIG. 6B and illustrating a gas supply pipe 9, a manifold 4, and a flow control plate 16, and the rest is illustrated in a side view.

Figure 7:
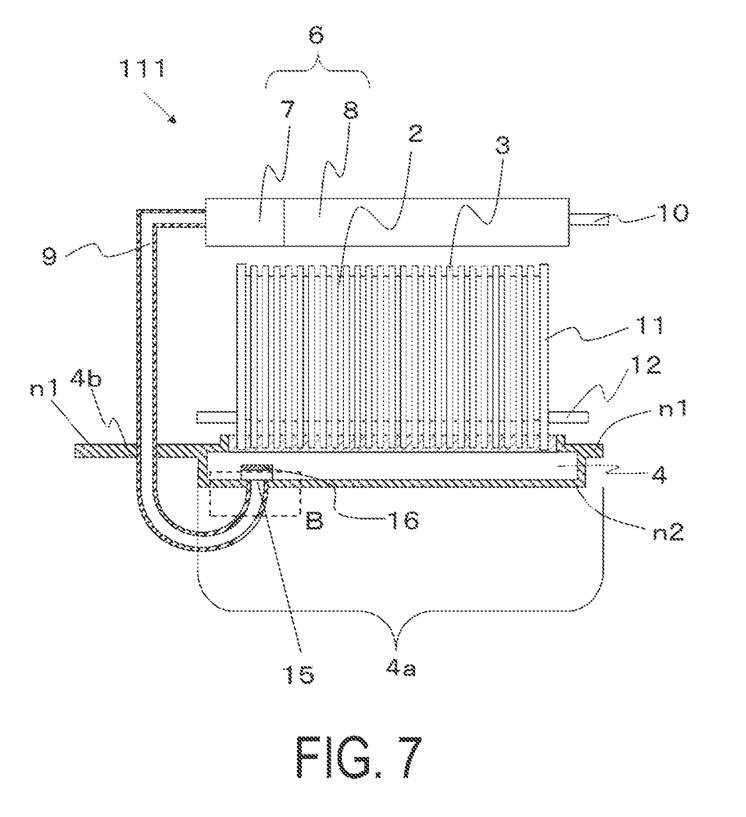
FIG. 7 is a cross-sectional view taken along line Y-Y in FIG. 6B with some portions being illustrated in a side view.

The manifold 4 of a cell stack device 111 illustrated in FIG. 6A, FIG. 6B, and FIG. 7 includes a main body portion 4a including a space communicated with gas flow passages, and a flange portion 4b protruding from the main body portion 4a. Gas is supplied to cells 3 via the space in the main body portion 4a. Another end of the gas supply pipe 9 is inserted from a first surface n1 side into a first through hole 14 provided penetrating the flange portion 4b, and is joined to the manifold 4, and is further inserted from a second surface n2 side into a second through hole 15 provided penetrating the main body portion 4a and is joined with the manifold 4. Then, the manifold 4 includes the flow control plate 16 spaced apart from the other end of the gas supply pipe 9 and covering the other end. In other words, to improve a flow distribution ratio, the flow control plate 16 is provided perpendicularly to a flow-out direction of gas flowing out through the second through hole 15. Further, the flow control plate 16 includes an opening portion. The opening portion may be provided such that the gas flows toward the cells 3 at an end portion of a cell stack 5 being away from the flow control plate 16. Note that, the first surface n1 and the second surface n2 refer to, in the manifold 4, a surface on the side on which the cell stack 5 is joined and mounted, and a surface on the opposite side to the first surface, respectively.

Figure 8A:
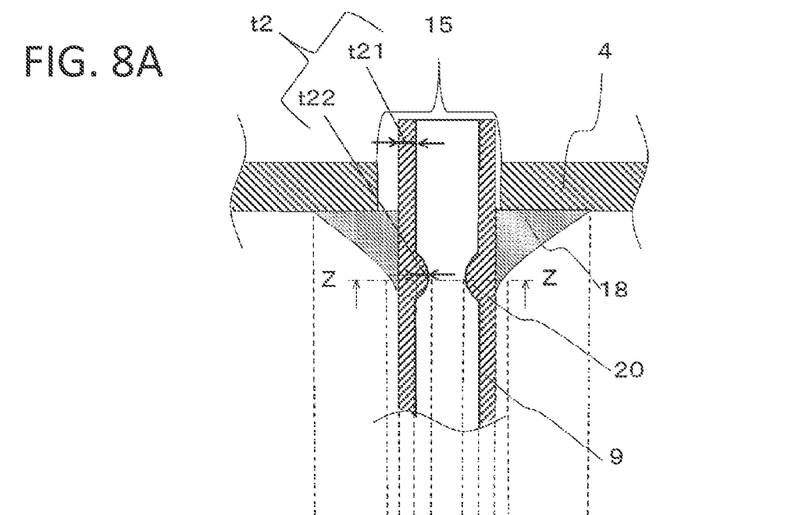
FIG. 8A is an enlarged vertical cross-sectional view illustrating a non-limiting example of section B in FIG. 7.
Figure 8B:
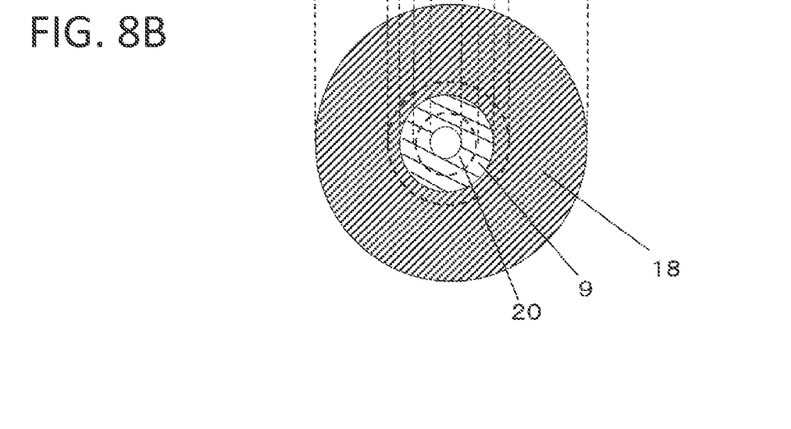
FIG. 8B is a horizontal cross-sectional view taken along line Z-Z in FIG. 8A.

FIG. 8A is an enlarged vertical cross-sectional view illustrating a non-limiting example of section B in FIG. 7, and FIG. 8B is a horizontal cross-sectional view taken along line Z-Z in FIG. 8A. In a non-limiting embodiment, the other end of the gas supply pipe 9 and the manifold 4 are joined via a second joining portion 18. Here, in a non-limiting embodiment, as illustrated in FIG. 8A, the gas supply pipe 9 includes a second protruding portion 20 protruding toward an inner side of the gas supply pipe 9 and located at a position corresponding to the second joining portion 18. Accordingly, even when the gas supply pipe 9 is deformed or moves, due to the second protruding portion 20, a thickness t2 of the gas supply pipe 9 at the second protruding portion 20 is increased at the position corresponding to the second joining portion 18, and thus cross-sectional area of the gas supply pipe 9 increases, and generation of cracking or chipping due to fatigue breakage or the like in the second joining portion 18 joined to the gas supply pipe 9 can be suppressed. Accordingly, the gas supply pipe 9 and the manifold 4 can be joined firmly, and as a result, joining reliability between the gas supply pipe 9 and the manifold 4 can be improved.

Here, as illustrated in FIG. 8A and FIG. 8B, the thickness t2 of the gas supply pipe 9 at the second protruding portion 20 is a thickness obtained by adding a maximum thickness t22 of the second protruding portion 20 to a thickness t21 of the gas supply pipe 9 itself.

As illustrated in FIG. 8B, the second protruding portion 20 can be provided along an entire circumference of an inner surface of the gas supply pipe 9 from a viewpoint of increasing the cross-sectional area of the gas supply pipe 9. Accordingly, generation of cracking or chipping due to fatigue breakage or the like in the first joining portion 17 joined to the gas supply pipe 9 can be suppressed.

Figure 9A:
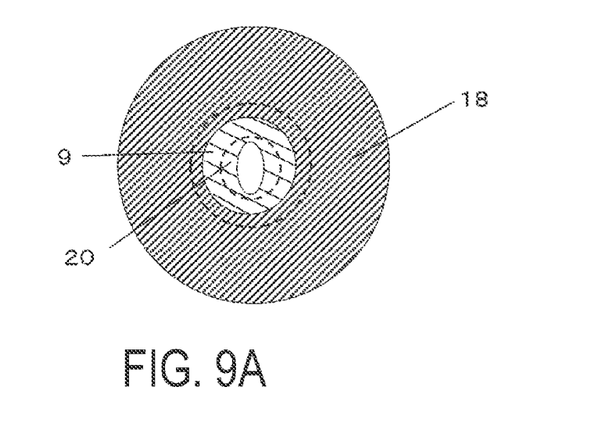
FIG. 9A is a horizontal cross-sectional view illustrating another non-limiting example of FIG. 8B.
Figure 9B:
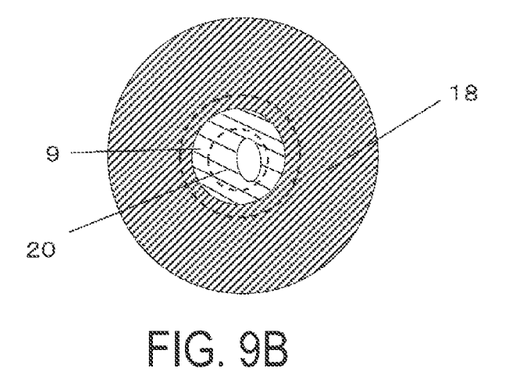
FIG. 9B is a horizontal cross-sectional view illustrating another non-limiting example of FIG. 8B.
Figure 9C:
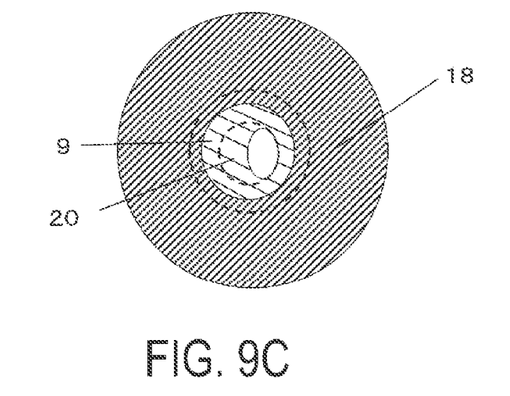
FIG. 9C is a horizontal cross-sectional view illustrating another non-limiting example of FIG. 8B.

Each of FIG. 9A, FIG. 9B, and FIG. 9C is a horizontal cross-sectional view illustrating another non-limiting example of FIG. 8B.

Each of FIG. 9A and FIG. 9B illustrates a non-limiting example in which a thickness of the gas supply pipe 9 at the second protruding portion 20 is uneven along an entire circumference.

As in FIG. 9A, a thin portion and a thick portion may be line-symmetrical. Further, as in FIG. 9B, the thin portion and the thick portion may be eccentric. As described above, even when the thickness of the gas supply pipe 9 at the second protruding portion 20 is uneven along the entire circumference, the gas supply pipe 9 remains thick without change, and generation of cracking or chipping due to the portion can be suppressed.

On the other hand, the second protruding portion 20 is not necessarily required to be provided along the entire circumference. As in FIG. 9C, the second protruding portion 20 may be provided partially. Even in the case where the second protruding portion 20 is provided partially as described above, generation of cracking or chipping due to the portion at which the gas supply pipe 9 is thick can be suppressed.

The thickness of the gas supply pipe 9 can be, for example, from 0.5 mm to 1.0 mm, and the thickness of the second protruding portion 20 can be, for example, from 0.1 mm to 0.5 mm.

Figure 10:
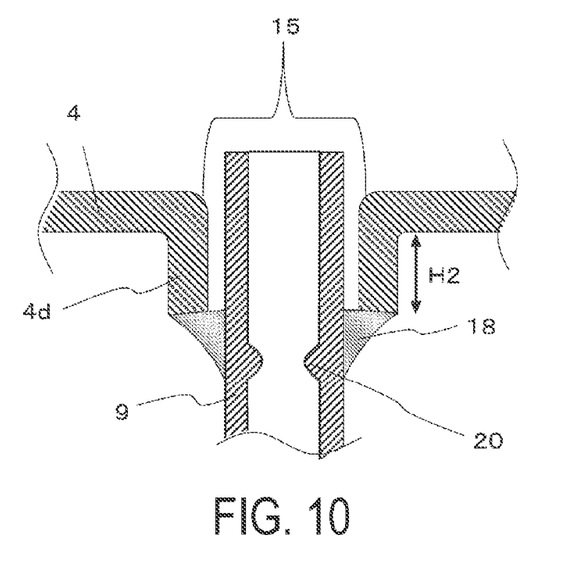
FIG. 10 is an enlarged vertical cross-sectional view illustrating another non-limiting example of section B of FIG. 7.
Figure 11:
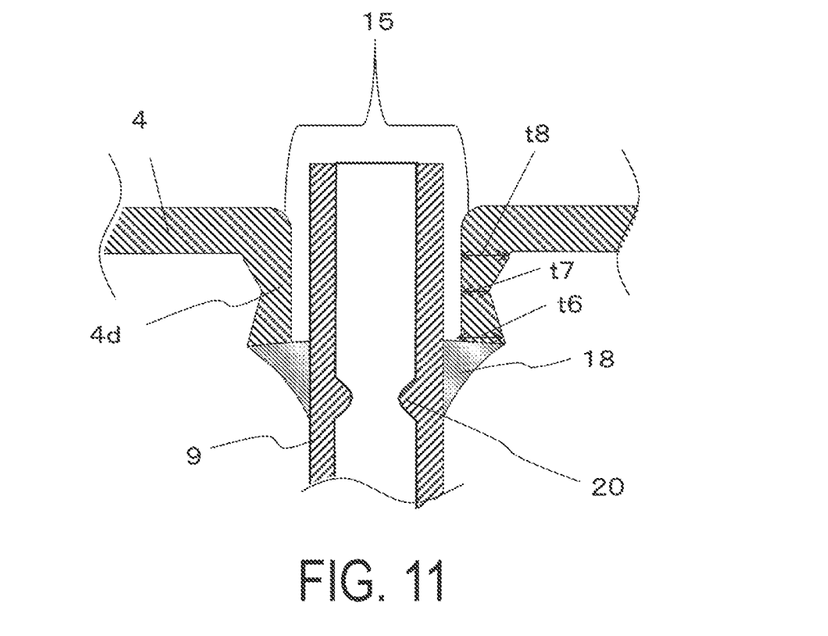
FIG. 11 is an enlarged vertical cross-sectional view illustrating another non-limiting example of section B of FIG. 7.

Each of FIG. 10 and FIG. 11 is an enlarged vertical cross-sectional view illustrating another non-limiting example of section B of FIG. 7.

In a non-limiting example illustrated in FIG. 10, a second bent portion 4d extending toward a reformer 6 side along the gas supply pipe 9 is provided in an outer periphery of the second through hole 15 in the manifold 4, and an upper end portion of the second bent portion 4d and the gas supply pipe 9 are joined via the second joining portion 18. The manifold 4 includes the second bent portion 4d, and thus the manifold 4 and the gas supply pipe 9 are joined easily. Further, the gas supply pipe 9 is inserted into the second through hole 15 easily. Note that a height H2 of the second bent portion 4d can be, for example, from 2 mm to 5 mm.

In the non-limiting example illustrated in FIG. 11, a thickness t6 of an upper end portion of the second bent portion 4d is larger than a thickness t7 of a center portion the second bent portion 4d and smaller than a thickness t8 of a lower end portion of the second bent portion 4d. In other words, the second bent portion 4d has such a shape that the center portion is recessed with respect to the upper end portion and the lower end portion expands. Accordingly, cross-sectional area of the upper end portion of the second bent portion 4d increases, and thus the upper end portion of the second bent portion 4d and the gas supply pipe 9 are firmly joined via the second joining portion 18. Moreover, the center portion is recessed with respect to the upper end portion, and thus the thickness t7 of the center portion is the smallest among the thickness t6, the thickness t7, and the thickness t8. This center portion having a small thickness can relieve stress generated when the gas supply pipe 9 is deformed or moves. Accordingly, the gas supply pipe 9 and the manifold 4 can be joined firmly. Furthermore, the lower end portion of the second bent portion 4d expands, and accordingly an angle formed between the second bent portion 4d and the manifold 4 is obtuse to obtain a gently-sloping shape. Hence, stress generated when the gas supply pipe 9 is deformed or moves can be relieved. As a result, generation of cracking or chipping between the second bent portion 4d and the manifold 4 can be suppressed.

At the second bent portion 4d, the thickness t6 can be, for example, 0.6 mm to 0.8 mm, the thickness t7 can be, for example, from 0.5 mm to 0.6 mm, and the thickness t8 can be, for example, from 0.9 mm to 1.2 mm.

Description will be made of a non-limiting example of a method of manufacturing the manifold 4 according to a non-limiting embodiment described above. In the following, detailed description will be made on a method of manufacturing the manifold 4 as illustrated in, for example, FIG. 7 in which the first through hole 14 is formed in the flange portion 4b and the second through hole 15 is formed in the main body portion 4a.

The first through hole 14 is formed by penetrating the flange portion 4b by a processing method such as punching. Similarly, the second through hole 15 is also formed by penetrating the main body portion 4a by a processing method such as punching.

The first joining portion 17 and the second joining portion 18 to which the gas supply pipe 9 and the manifold 4 are joined can be provided by joining an outer surface of the manifold 4 and the gas supply pipe 9 by using a metallurgical joining method. The metallurgical joining method is a method of performing joining by fusion welding, pressure welding, or soldering. Non-limiting examples of the fusion welding include laser welding, plasma arc welding, inert gas arc welding, MAG welding, or gas welding. Further, non-limiting examples of the pressure welding include ultrasonic welding, friction welding, or explosive welding.

Further, to provide the first bent portion 4c and the second bent portion 4d integrally with the outer peripheries of the first through hole 14 and the second through hole 15, respectively in the manifold 4, a processing method such as pressing using dies having shapes of the first bent portion 4c and the second bent portion 4d can be performed. Further, in a case where the first bent portion 4c and the second bent portion 4d are provided separately from the outer peripheries of the first through hole 14 and the second through hole 15, respectively, members having shapes of the first bent portion 4c and the second bent portion 4d may be prepared, and the respective members may be joined to the outer peripheries of the first through hole 14 and the second through hole 15 by the metallurgical joining method described above.

Figure 12:
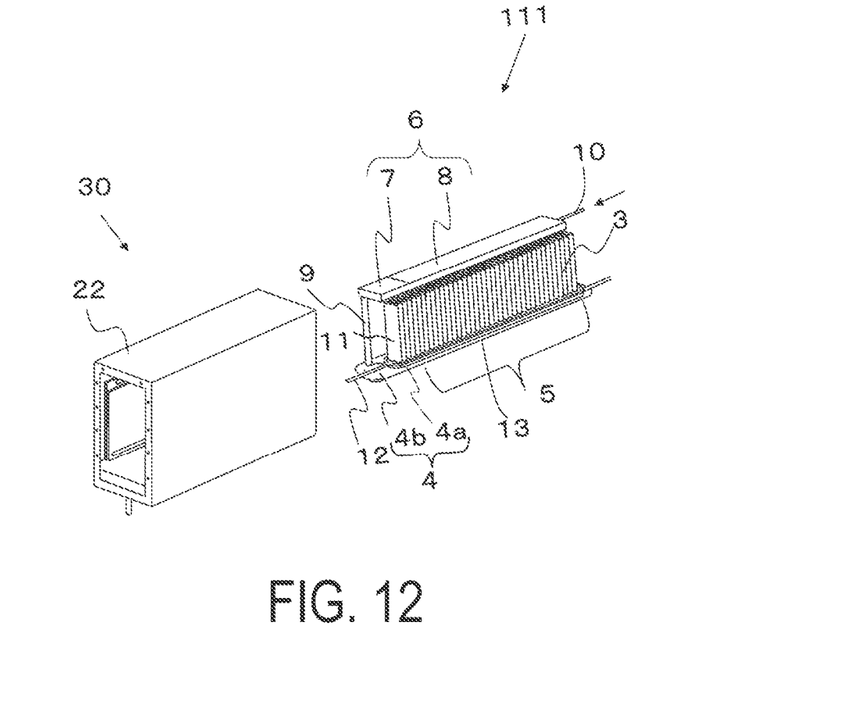
FIG. 12 is an external perspective view illustrating a non-limiting example of a module according to a non-limiting embodiment.

FIG. 12 is an external perspective view illustrating a non-limiting example of a fuel cell module serving as a module including the cell stack device 111 housed in a housing container, and the cell stack device 111 illustrated in FIG. 6A is housed inside a housing container 22 having a rectangular parallelepiped shape.

Note that for the purpose of obtaining fuel gas to be used in the cells 3, the reformer 6 configured to generate fuel gas by reforming raw fuel such as natural gas and kerosene is disposed above the cell stack 5. Then, the fuel gas generated in the reformer 6 is supplied to the manifold 4 via the gas supply pipe 9, and is supplied, via the manifold 4, to the gas flow passages provided inside the cells 3.

Note that FIG. 12 illustrates a state in which portions (front and back surfaces) of the housing container 22 are detached and the cell stack device 111 and the reformer 6 housed inside are removed to the rear. In a module 30 illustrated in FIG. 12, the cell stack device 111 can be housed in the housing container 22 by being slid into the housing container 22. Note that the cell stack device 111 may include the reformer 6.

Further, in the module 30 according to a non-limiting embodiment, the cell stack device 111 described above is housed in the housing container 22, and hence the module 30 with improved durability can be obtained.

Figure 13:
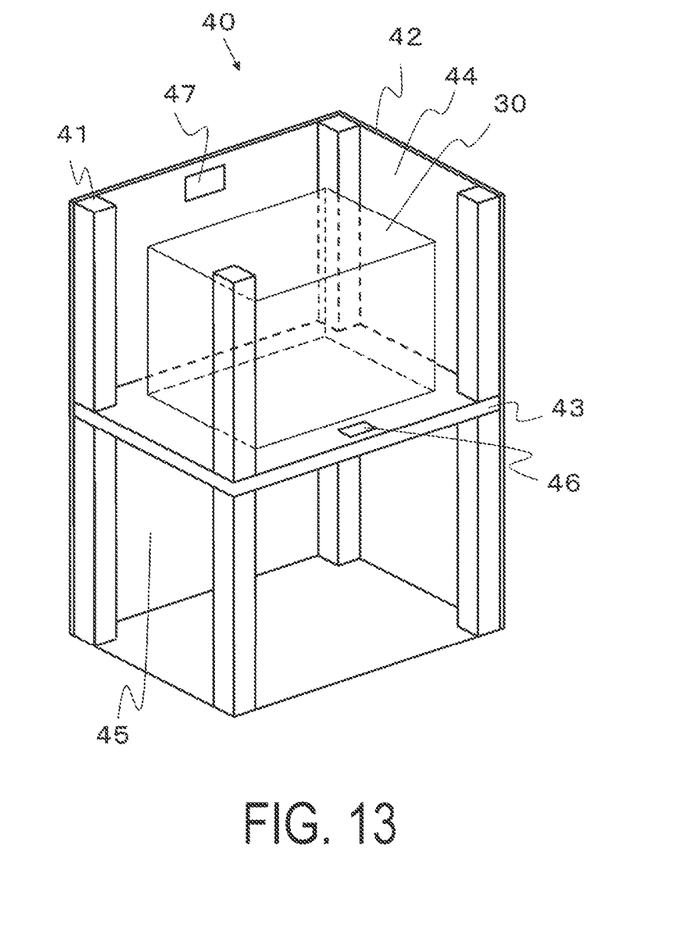
FIG. 13 is a perspective view illustrating a non-limiting example of a module housing device according to a non-limiting embodiment with a portion of the module housing device not being illustrated.

FIG. 13 is a perspective view illustrating a non-limiting example of a fuel cell device serving as a module housing device in which the module 30 illustrated in FIG. 12 and an auxiliary device configured to operate the cell stack device 111 are housed in an external casing. Note that a portion of the configuration is omitted in FIG. 13.

In a module housing device 40 illustrated in FIG. 13, the external casing including supports 41 and exterior plates 42 is divided into an upper section and a lower section by a dividing plate 43. The upper section serves as a module housing chamber 44 that houses the module 30 described above. The lower section serves as an auxiliary device housing chamber 45 that houses the auxiliary device configured to operate the module 30. Note that the auxiliary device housed in the auxiliary device housing chamber 45 is not illustrated.

Further, an airflow hole 46 is provided in the dividing plate 43. The airflow hole 46 is configured to cause air in the auxiliary device housing chamber 45 to flow into the module housing chamber 44. An exhaust hole 47 is provided in a portion of the outer plates 42 constituting the module housing chamber 44. The exhaust hole 47 is configured to discharge air inside the module housing chamber 44.

As described above, in the module housing device 40, the module 30 with improved durability is housed in the module housing chamber 44, and accordingly the module housing device 40 with improved durability can be obtained.

Note that, for example, in a non-limiting embodiment described above, the description is made by using so-called vertical cells; however, horizontal cells referred to commonly as horizontal cells in which a plurality of power generating elements are provided on a support substrate, or so-called cylindrical cells can also be used.

The non-limiting embodiments according to the present disclosure are described above, but the present disclosure is not limited to the above-described embodiments, and can have any embodiments as long as it does not depart from the spirit of the present disclosure.

REFERENCE SIGNS LIST 1, 111 Cell stack device
3 Cell
4 Manifold
4a Main body portion
4b Flange portion
4c First bent portion
4d Second bent portion
5 Cell stack
6 Gas supply portion (reformer)
9 Gas supply pipe
14 First through hole
15 Second through hole
17 First joining portion
18 Second joining portion
19 First protruding portion
20 Second protruding portion
30 Module (fuel cell module)
40 Module housing device (fuel cell device)
t1 Thickness of gas supply pipe at first protruding portion
t11 Thickness of gas supply pipe itself
t12 Maximum thickness of first protruding portion
t2 Thickness of gas supply pipe at second protruding portion
t21 Thickness of gas supply pipe itself
t22 Maximum thickness of second protruding portion

What is claimed is:

1. A cell stack device comprising:
a cell stack comprising a plurality of cells;
a manifold configured to supply gas to the plurality of cells; and
a gas supply pipe configured to supply the gas to the manifold;
wherein
the gas supply pipe is inserted into a first through hole in the manifold, and is joined to the manifold via a first joining portion, and
the gas supply pipe comprises a first protruding portion protruding inwards from an inner side of the gas supply pipe and located at a position corresponding to the first joining portion in any cross-section along an insertion direction of the gas supply pipe into the manifold.

2. The cell stack device according to claim 1, wherein the first protruding portion is provided along an entire circumference of the inner surface of the gas supply pipe.

3. The cell stack device according to claim 2, wherein a thickness of the gas supply pipe at the first protruding portion is uneven along an entire circumference.

4. The cell stack device according to claim 1 wherein the manifold comprises a first bent portion extending along the gas supply pipe toward the gas supply portion, and the first bent portion is provided along an outer perimeter of the first through hole; and
a distal end portion of the first bent portion and the gas supply pipe are joined via the first joining portion.

5. The cell stack device according to claim 4, wherein a thickness of the distal end portion of the first bent portion is larger than a thickness of a central portion of the first bent portion, and is smaller than a thickness of a proximal end portion of the first bent portion.

6. The cell stack device according to claim 1, wherein the manifold further comprises a main body portion, and a flange portion protruding from the main body portion;
the flange portion comprises the first through hole, and the main body portion comprises a second through hole;
the gas supply pipe comprises a first end of the gas supply pipe connected to a gas supply portion and a second end of the gas supply pipe;
the second end of the gas supply pipe is inserted into the second through hole, and the second end and the manifold are joined via a second joining portion; and
the gas supply pipe comprises a second protruding portion protruding inwards from an inner side of the gas supply pipe and located at a position corresponding to the second joining portion in any cross-section along an insertion direction of the gas supply pipe into the manifold.

7. The cell stack device according to claim 6, wherein the second protruding portion is provided along an entire circumference of the inner surface of the gas supply pipe.

8. The cell stack device according to claim 7, wherein a thickness of the gas supply pipe at the second protruding portion is uneven along an entire circumference.

9. The cell stack device according to claim 6, wherein the manifold further comprises a second bent portion extending along the gas supply pipe toward the gas supply portion, and the second bent portion is provided along an outer perimeter of the second through hole; and
a distal end portion of the second bent portion and the gas supply pipe are joined via the second joining portion.

10. The cell stack device according to claim 9, wherein a thickness of the distal end portion of the second bent portion is larger than a thickness of a central portion of the second bent portion, and is smaller than a thickness of a proximal end portion of the second bent portion.

11. A module comprising:
the cell stack device according to claim 1 housed in a housing container.

12. A module housing device comprising:
the module according to claim 11; and
an auxiliary device configured to operate the module, wherein
the module and the auxiliary device are housed in an external casing.

* * * * *